(12) United States Patent
Anttila et al.

(10) Patent No.: US 8,417,827 B2
(45) Date of Patent: Apr. 9, 2013

(54) SYNCHRONOUS MEDIA PLAYBACK AND MESSAGING SYSTEM

(75) Inventors: Akseli Anttila, Helsinki (FI); Younghee Jung, Helsinki (FI)

(73) Assignee: Nokia Corporation, Espoo (FI)

( * ) Notice: Subject to any disclaimer, the term of this patent is extended or adjusted under 35 U.S.C. 154(b) by 2177 days.

(21) Appl. No.: 10/017,654

(22) Filed: Dec. 12, 2001

(65) Prior Publication Data

US 2003/0126211 A1 Jul. 3, 2003

(51) Int. Cl.
*G06F 15/16* (2006.01)
(52) U.S. Cl.
USPC ........... 709/231; 709/230; 709/232; 709/233; 709/234; 709/217; 709/227
(58) Field of Classification Search ................... 709/200, 709/231, 219, 248, 203, 217, 204
See application file for complete search history.

(56) References Cited

U.S. PATENT DOCUMENTS

| | | | | |
|---|---|---|---|---|
| 5,339,413 A * | 8/1994 | Koval et al. | ................... | 719/314 |
| 5,600,775 A * | 2/1997 | King et al. | ................... | 715/500 |
| 5,615,401 A * | 3/1997 | Harscoet et al. | ................ | 719/322 |
| 5,734,589 A * | 3/1998 | Kostreski et al. | ............. | 715/716 |
| 5,784,527 A * | 7/1998 | Ort | ................. | 386/220 |
| 5,805,821 A * | 9/1998 | Saxena et al. | ................ | 709/231 |
| 5,828,866 A * | 10/1998 | Hao et al. | ............................ | 703/7 |
| 5,854,898 A * | 12/1998 | Riddle | .......................... | 709/231 |
| 5,920,338 A * | 7/1999 | Katz | .............................. | 348/150 |
| 5,930,473 A | 7/1999 | Teng et al. | | |
| 5,953,506 A * | 9/1999 | Kalra et al. | ................... | 709/231 |
| 5,999,977 A * | 12/1999 | Riddle | .......................... | 709/227 |
| 6,003,084 A * | 12/1999 | Green et al. | ................... | 709/227 |
| 6,006,253 A * | 12/1999 | Kumar et al. | ................. | 709/204 |
| 6,075,560 A * | 6/2000 | Katz | .............................. | 348/150 |
| 6,223,211 B1 * | 4/2001 | Hamilton et al. | ............. | 709/203 |

(Continued)

FOREIGN PATENT DOCUMENTS

| WO | 9946702 | | 9/1999 |
|---|---|---|---|
| WO | WO 99/46702 | * | 9/1999 |
| WO | 0056088 | | 9/2000 |

OTHER PUBLICATIONS

Microsoft, Computer Dictionary, Fifth Edition, by Michael Heim, p. 506.*
RFC 2327: SDP, Handley, Apr. 1998.*

(Continued)

*Primary Examiner* — Backhean Tiv
(74) *Attorney, Agent, or Firm* — Ditthavong Mori & Steiner, P.C.

(57) ABSTRACT

The present invention provides synchronous media playback and messaging between a host user and at least one guest user. The host user wishes to initiate a playback session in which the host user and guest users view a presentation that corresponds to a media file that is locally stored on each of the user's terminals. In order to initiate the playback session, the host user invites the guest users. If a guest user wishes to participate in the playback session, the guest user accepts the invitation. When the host user determines that the session should begin, based upon the acceptances from the guest users, the host user initiates the playback of the media file that is locally stored at each terminal. The present invention also supports playback actions that may occur during the playback session. The host user can terminate the playback session, and any of the guest users can withdraw during the playback session.

36 Claims, 9 Drawing Sheets

U.S. PATENT DOCUMENTS

| | | | |
|---|---|---|---|
| 6,314,466 B1 * | 11/2001 | Agarwal et al. | 709/231 |
| 6,341,316 B1 | 1/2002 | Kloba et al. | |
| 6,351,467 B1 | 2/2002 | Dillon | |
| 6,353,174 B1 * | 3/2002 | Schmidt et al. | 84/609 |
| 6,389,471 B1 | 5/2002 | Agraharam et al. | |
| 6,424,841 B1 | 7/2002 | Gustafsson | |
| 6,425,131 B2 * | 7/2002 | Crandall et al. | 725/106 |
| 6,430,576 B1 | 8/2002 | Gates et al. | |
| 6,453,355 B1 * | 9/2002 | Jones et al. | 709/230 |
| 6,480,961 B2 * | 11/2002 | Rajasekharan et al. | 726/27 |
| 6,526,335 B1 * | 2/2003 | Treyz et al. | 701/1 |
| 6,594,260 B1 * | 7/2003 | Aviani et al. | 370/389 |
| 6,604,129 B2 * | 8/2003 | Slutsman et al. | 709/204 |
| 6,631,410 B1 * | 10/2003 | Kowalski et al. | 709/224 |
| 6,671,732 B1 * | 12/2003 | Weiner | 709/231 |
| 6,757,517 B2 * | 6/2004 | Chang | 455/3.05 |
| 6,816,895 B2 * | 11/2004 | Andreakis et al. | 709/219 |
| 6,891,822 B1 * | 5/2005 | Gubbi et al. | 370/345 |
| 6,907,570 B2 * | 6/2005 | Amir et al. | 715/720 |
| 6,976,094 B1 * | 12/2005 | Dalrymple et al. | 709/248 |
| 7,076,560 B1 * | 7/2006 | Lango et al. | 709/231 |
| 7,133,923 B2 * | 11/2006 | MeLampy et al. | 709/231 |
| 7,136,934 B2 * | 11/2006 | Carter et al. | 709/248 |
| 7,193,987 B2 * | 3/2007 | Vilander | 370/338 |
| 7,200,357 B2 * | 4/2007 | Janik et al. | 455/3.02 |
| 7,493,644 B1 * | 2/2009 | Tanskanen | 725/62 |
| 7,890,661 B2 * | 2/2011 | Spurgat et al. | 709/248 |
| 2001/0003523 A1 | 6/2001 | Crandall et al. | |
| 2001/0025316 A1 * | 9/2001 | Oh | 709/231 |
| 2001/0037367 A1 | 11/2001 | Iyer | |
| 2001/0049728 A1 | 12/2001 | Kang | |
| 2002/0069419 A1 * | 6/2002 | Raverdy et al. | 725/87 |
| 2002/0076025 A1 * | 6/2002 | Liversidge et al. | 379/202.01 |
| 2002/0078454 A1 * | 6/2002 | Auberger | 725/49 |
| 2002/0091848 A1 * | 7/2002 | Agresta et al. | 709/231 |
| 2002/0095612 A1 * | 7/2002 | Furhrer et al. | 713/400 |
| 2002/0107040 A1 * | 8/2002 | Crandall et al. | 455/517 |
| 2002/0138569 A1 * | 9/2002 | Slutsman et al. | 709/204 |
| 2002/0144276 A1 * | 10/2002 | Radford et al. | 725/87 |
| 2002/0164973 A1 * | 11/2002 | Janik et al. | 455/403 |
| 2002/0168938 A1 * | 11/2002 | Chang | 455/41 |
| 2002/0174243 A1 * | 11/2002 | Spurgat et al. | 709/231 |
| 2002/0194309 A1 * | 12/2002 | Carter et al. | 709/219 |
| 2003/0014488 A1 * | 1/2003 | Dalal et al. | 709/204 |
| 2003/0023741 A1 * | 1/2003 | Tomassetti et al. | 709/231 |

OTHER PUBLICATIONS

RFC 2543: SIP, Handley, Mar. 1999.*
International Search Report, International Application No. PCT/IB02/05215, Mar. 14, 2003.
European Search Report for EP 02788305.7.
European Search Report for EP 02788305.7, Feb. 5, 2007.
European Office Action for corresponding EP Application No. 02 788 305.7-1244, Jun. 10, 2011, pp. 1-6.

* cited by examiner

SYNCHRONOUS MEDIA PLAYBACK AND MESSAGING SYSTEM

FIELD OF THE INVENTION

This invention is related to a communications system that provides synchronous media playback and messaging.

BACKGROUND OF THE INVENTION

Telecommunications is expanding from just providing communications from one user to another user to providing multimedia communications among a group of users. Moreover, telecommunications is more than a mechanism for the traditional functionality of providing communications. Telecommunications is allowing people to socialize even though people may not be located in the immediate vicinity of each other. On the other hand, telecommunications is enabling people in the same immediate vicinity to converse even though people are not really acquainted with each other. As one example, while in the same recreational venue a wireless subscriber may use short message service (SMS) to talk with another wireless subscriber, whom the wireless subscriber would like to know. Communications is thus providing a non-traditional function of introducing people in order for people to meet with other people.

In line with the above discussion, friends want to socialize with each other whether or not in close proximity. However, people are "on the go," traveling to other cities, states, or countries. People want to share the experience of enjoying a good song or video with friends even though they not are physically near each other. They want to talk about the feeling and ideas that the performance or recording has provoked. In order to provide an effective experience, both the medium being perceived and any associated communication should be synchronized among all the participants.

It would be advantageous to enable people to watch or listen to the same performance or recording, such as a song or video that is conveyed on a recording medium, at substantially the same time in distant locations and to engage in interaction with other users having access to the recording medium. Moreover, it is important that the intellectual property rights of the media owners are protected.

SUMMARY OF THE INVENTION

To overcome limitations in the prior art described above and to overcome other limitations that will be apparent upon reading and understanding the present specification, the present invention is directed to provide synchronous media playback and messaging between a host user and at least one guest user. The host user wishes to initiate a playback session in which the host user and the guest users view a presentation, corresponding to a media file that is locally stored on each of the user's terminals. In order to initiate the playback session, the host user invites the guest users. If a guest user wishes to participate in the playback session, the guest user accepts the invitation. When the host user determines that the session should begin, based upon the acceptances from the guest users, the host user initiates the playback of the media file that is locally stored at each terminal. The present invention also supports playback actions that may occur during the playback session. Action types include pause playback, rewind, fast forward, user-specified internal effect algorithm to modify audio or video, or comment text from a user. The host user can terminate the playback session, and any of the guest users can withdraw during the playback session.

The disclosure provides an exemplary embodiment in which wireless terminals communicate through a central server using Global System of Mobile Communications (GSM) short message service SMS messages. However, variations of the exemplary embodiment support other wireless standards as well as wireline services such as the Internet. Several variations for providing synchronicity (the playing of the media file at the terminals and the associated messaging) is also disclosed.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
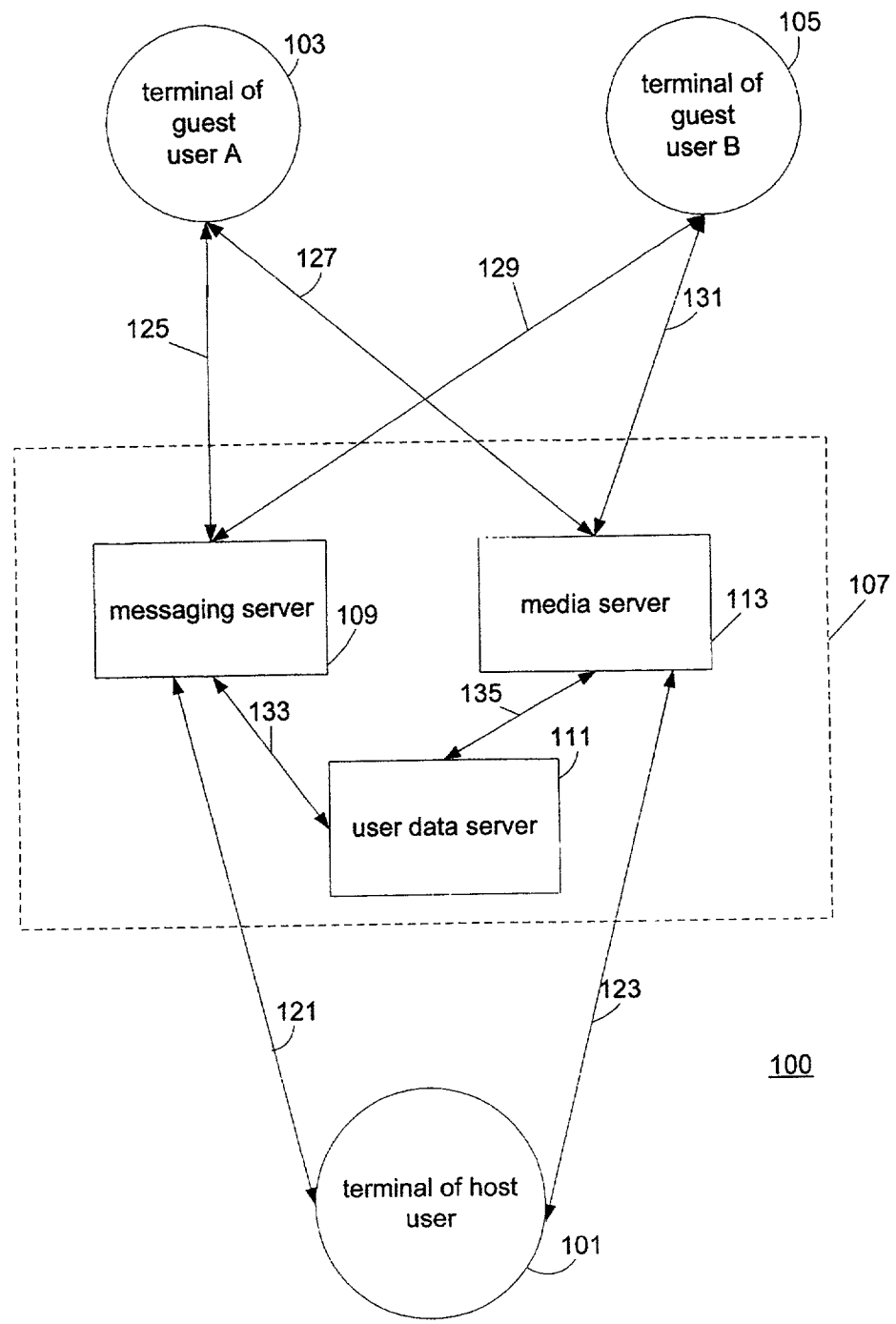
FIG. 1 shows an architecture of a synchronous media playback and messaging system according to one embodiment of the present invention.

FIG. 1 shows an architecture of a synchronous media playback and messaging system 100 according to one embodiment of the present invention. FIG. 1 shows terminal 101 (host user), terminal 103 (guest user A), and terminal 105 (guest user B) being served by central server 107 in order to provide synchronous media playback and messaging service. Terminals 101, 103, or 105 may be implemented with one or more microprocessors, application specific integrated circuit (ASIC), discrete logic circuitry, or a combination of the three approaches. Terminals 101, 103, and 105 provide for communications over associated communications channels (e.g. 121 and 123) and provide playback capabilities (e.g. a video display). Central server 107 comprises three logical components: messaging server 109, user data server 111, and media server 113. Servers 109, 111, and 113 may be implemented on a common platform, e.g. a computer platform or may be implemented on separate platforms. In fact, the present invention can support a configuration in which each of the servers are operated or owned by different service providers.

Terminal 101 initiates service (as initiated by the host user) by sending invite request 201 (as explained in FIG. 2) over link 121 to messaging server 109. Link 121 may be one of a variety of communication channels, including a wireless communication channel, wireline communications channels using the Internet, or cable modem channel. If link 121 is a wireless communication channel, any wireless standard is applicable, including Global System of Mobile Communications (GSM), Telecommunications Industry Association (TIA) IS-95 and cdma2000 (CDMA), TIA IS-136 and IS-54 (TDMA), EIA/TIA-553 (analog), and Universal Mobile Telecommunications System (UMTS). In the exemplary embodiment, link 121 is implemented using short message service as supported by GSM.

Terminal 101 can also communicate with media server 113 over link 123. Link 123 can also assume one of various communications channels, including a wireless communications channel, wireline channel, or cable modem channel. Terminal 101 can download a selected media file from media server 113 so that the media file can be played on a playback device that is logically associated with terminal 101. (As examples, the media file can be an audio media file, a visual media file, or an audiovisual media file.) In one variation of the embodiment, the accessing of a media file is in accordance with copyright protection provided to the owner of the associated medium as known in the art. Terminal 101 can use a usage right certificate in order to obtain permission to access the selected media file from media server 113. The media file may be created by a third party or may be created by the host user. System 100 can utilize Digital Rights Management (DRM) mechanisms to ensure that users are not able to distribute media files to which they do not have the distribution rights. In one variation, terminal 101 has a local media storage memory or removable media device (such as a CD or DVD player) and the server system 107 is accessed in order to fetch DRM certificates, which are used to decrypt the media stored in the memory or the removable media storage. Thus the distribution of the media files is replaced by the distribution of the decryption certificates. Alternatively, the media server 113 can simply check the eligibility or compliancy of the locally stored media file and deliver the permission for participating the playback session to central server 107.

In the exemplary embodiment, the host user wishes to initiate a playback session with guest user A (whose name is "Bob" and corresponds to terminal 103) and guest user B (whose name is "Jane" and corresponds to terminal 105). As previously referenced, terminal 101 correspondingly sends invite request 201 to messaging server 109. Invite request 201 comprises a media file identification and the identifications of guest user A and guest user B. The identity of a guest user may be the telephone number of the corresponding terminal or may be name of the guest user. Messaging server 109 sends a request to user data server 111 over link 133 to record the identities of guest users A and B. Moreover, if the name (e.g. "Bob") of a guest user is the identity of the user, then user data server 111 translates the name into a telephone number of the corresponding terminal as stored in a data structure in user data server 111. Messaging server 109 uses the telephone number to distribute (forward) the invite request to guest user A and guest server B. Additionally, user data server 111 may translate the media file identification in order that the guest user can retrieve the selected media file from media server 113. User data server 111 performs the translation in concert with media server 113 through link 135.

Terminal 103 (guest user A) and terminal 105 (guest user B) receive the distributed invite requests from messaging server 109 over links 125 and 129, respectively. As with link 121, links 125 and 129 can correspond to one of a number of communication channel types. Also, terminal 103 and terminal 105 can download the selected media file as identified by the media file identification in invite request 201 through links 127 and 131, respectively. FIG. 1 shows only one media server (113); however, other variations of the exemplary embodiment can comprise a plurality of media servers, which may be physically distinct and operated by different service providers. Messaging server 109 distributes additional messaging as is required in the playback session as will become apparent in the subsequent discussion. As an example, terminal 105 (guest user B) may send action request 225 in order to request an action during the playback session.

While the disclosed exemplary embodiment has at least one server interceding in the synchronous media playback and messaging configuration, other embodiments may utilize direct communications between terminals 101, 103, and 105 obviating the need for any servers. For example, terminal 101 may directly communicate to terminal 103 and to terminal 105 through a wireless infrastructure comprising switching and radio equipment.

With a variation of the embodiment, terminal 101 (host user) queries terminals for the media files or certificates they have and create "ad-hoc" viewer groups based on matching file ownerships. A local (Bluetooth) or network (Internet) service may be used to poll any accessible terminals for the media files or DRM certificates. When terminals are found that have the same media files or certificates, an alert is sent to the users indicating that a playback session can be formed with the devices. The users then have the option to start or schedule a session. Access privilege systems for allowing such queries apply. Terminal 101 (host user) can distribute the scheduled playback session to unspecified users, as another form of invitation. Central server 107 can manage a database of open session invitations so that interested users can search for a playback session with specific interest in either the media file or the host user's identity and sign up for the playback session.

Figure 2:
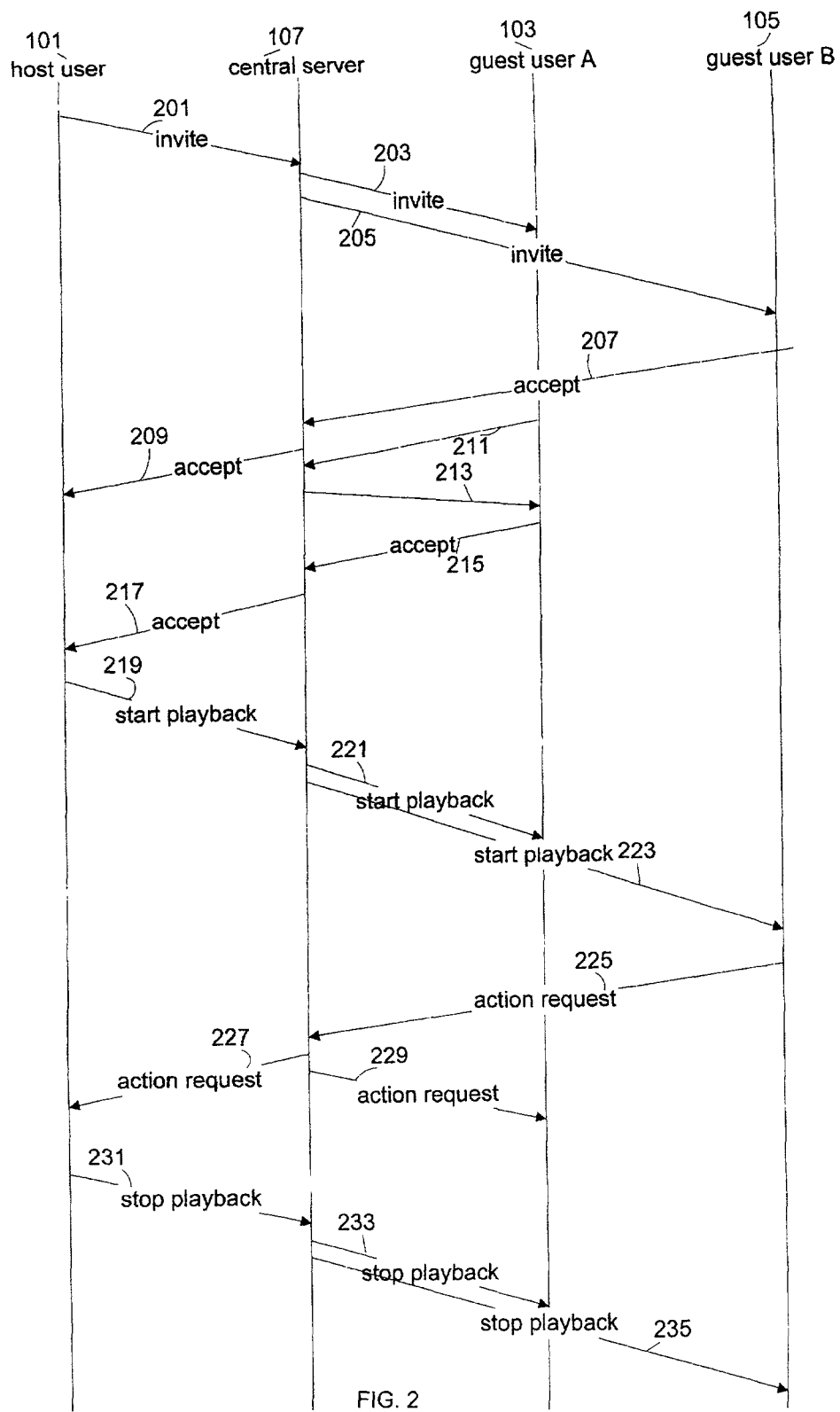
FIG. 2 shows a message scenario in accordance with the architecture shown in FIG. 1.

FIG. 2 shows a message scenario in accordance with the architecture shown in FIG. 1. In particular, FIG. 2 shows the message flow between terminal 101 (host user), central server 107, terminal 103 (guest user A) and terminal 105 (guest user B). In the variation of the exemplary embodiment, central server 107 is considered to be one entity. However, other variations of the exemplary embodiment can utilize messaging between the different server types (e.g. messaging server 109, user data server 111, and media server 113).

As was discussed in relation to FIG. 1, the host user initiates a playback session by causing terminal 101 to send invite request 201 to messaging server 109. In one variation, invite request 201 comprises various information fields, including guest user ID, session ID, media file ID, host user ID, playback options, playback scheduling, and a free text string of other media type that explains the invitation to the guest users. Playback options give specific guest users permission to request different types of actions during the playback session. Table 1 shows information that is contained in the invite request in accordance with the exemplary embodiment. With this example, a GSM SMS message is able to transport 160 characters of text. (Alternatively, a Multimedia Messaging System (MMS) message can be utilized for supporting synchronous media and playback messaging.) In the example, the SMS message is represented as:
syncplay,msg__1,hID__1234,sID__2345,mID__3456,gID__4567,pbmode__2,pbst__173006 112001,txt_"Cool music, join in",end#

The fields of the SMS message shown in Table 1 utilize only 111 characters so the free text entry is limited to the remaining 160 characters (i.e. 49 characters). A possible text entry in this example is "Cool music, join in—Pete!"

TABLE 1

| | |
|---|---|
| #syncplay | message identifier |
| msg_1 | message type identifier |
| | 1 = invitation |
| hID_1234 | host user id as a reference to the user database |
| sID_2345 | session id as a reference to the user database |
| mID_3456 | media entity id as a reference to the media database |
| gID_4567 | guest user id. Guest user ids can refer to a group of multiple guest users |
| pbmode_2 | playback mode identifier |
| | 1 = start playback by host command |
| | 2 = start playback at playback start time |
| pbst_173006112001 | playback start time (hhmmddmoyyyy) |
| txt_"Cool music, join in - Pete" | free text message |
| end# | message end |

With another variation of the exemplary embodiment, links 121, 125, and 129 are Internet communication channels. In such a configuration, extensible Markup Language (XML) can be utilized rather than GSM SMS. An example of invite request 201 using XML is:

```
<syncplay msg_type="1">
    <host id="1234"/>
    <session id="2345"/>
    <media id="3456"/>
    <guests>
        <guest id="4567"/>
    </guests>
    <playback>
        <mode id="2"/>
        <start format="hh:mm dd.mo.yyyy">
            17:30 06.11.2001
        </start>
    </playback>
    <message>
        Cool music, join in - Pete
    </message>
</syncplay>
```

Central server 107 distributes invite request 203 to terminal 103 and invite request 205 to terminal 105. When each of the terminals receive the invite requests, an associated playback player compares its local storage of media files and/or rights certificates to the media file ID in order to determine whether the guest user must obtain this media file or access rights to it. If the guest user needs to obtain the media file, the guest user's terminal (103, 105) communicates with central server 107 and initiates suitable transactional procedures. If media server 113 were a separate physical entity, then the user's terminal needs to establish a transaction with the appropriate media server.

With reference to FIG. 2, guest user B has access to the selected media file, and consequently terminal 105 returns accept response 207 to central server 107. Central server 107 determines (specifically, user data server 111) that guest user B is associated with a playback session that the host user initiated, and consequently accept message 209 is forwarded to terminal 101. However, terminal 103 does not immediately return an accept request message because terminal 103 does not currently store the media file in local memory. Thus, a download procedure (comprising messages 213 and 215) is required so that the selected media file can be downloaded into the local memory of terminal 103. When the downloading of the media file is completed, terminal 103 returns accept response 215 to central server 107. Central server 107 forwards accept request 217 to terminal 101.

The host user ("Pete") is informed that both guest user A ("Bob") and guest user B ("Jane") have accepted participating in the playback session. In this example, the host user waits until central server 107 reports that all the guest users have accepted (by returning accept response messages). In general, the host user can initiate the playback session whenever a sufficient number of quest users have accepted. Consequently, host user ("Pete") manipulates terminal 101 to send start playback request 219 to central server 107. As with invite request 201, the exemplary embodiment utilizes GSM SMS. In this example, the SMS message is:
syncplay,msg_2,hID_1234,sID_2345,mID_3456,tc_00051200,pbc_1, txt_"Wow, did you see that",end#

TABLE 2

| | |
|---|---|
| #syncplay | message identifier |
| msg_2 | message type identifier |
| | 2 = playback control message |
| hID_1234 | host user id as a reference to the user database |
| sID_2345 | session id as a reference to the user database |
| mID_3456 | media entity id as a reference to the media database |
| tc_00051200 | time code identifier within the media entity (hhmmssff). Playback control message is tied to specified time code |
| pbc_1 | playback control identifier |
| | 1 = display user created text |
| txt_"Wow, did you see that" | free text message |
| end# | message end |

Central server 107 distributes start playback request 219 by sending start playback request 221 to terminal 103 (guest user A) and start playback request 223 to terminal 105 (guest user B). The beginning of the playback session need not correspond to the beginning of the media file and thus can correspond to any time within the media file. When terminals 103 and 105 receive start playback request 221 and 223 respectively, the associated player device starts playing the media file at the predetermined time as indicated in invite request 203 and 205 (refer to the playback start time field in Table 1). In a variation of the exemplary embodiment, central server 107 distributes the start playback request to the terminals of all active users, including the host user, in order to achieve a degree of synchronism that compensates for varying time delays in system 100. In one variation the playback session can be started regardless of the replies from the guest users, thus allowing the host user to start playback at any time. The playback start time can be compared with the actual time that a guest user accepts the invitation and starts viewing the playback. This offset can be used to achieve a degree of synchronism that compensates for the various time delays in system 100, whether network or user action related.

During the playback session (as initiated by start playback requests 221 and 223), any of the active users (host user and guest users) can request a playback action. In order to do so, an active user sends an action request (e.g. action request 225) to central server 107. The action request message requests one of a number of action types during the playback session, including pause playback, rewind, fast-forward, user-specified internal effect algorithm to modify audio or video (e.g. altering the audio and video in order to accentuate a favorite actress), or textual comment from a user. The first three action types are patterned after actions that are typically associated with an audio cassette player or a VCR. The fourth action type is user-specified that can be customized for the specific application. As an example, the media player can be instructed to emphasize the dialog of a particular actress in a particular scene. As another example, if a user wishes to send a comment to the other users, an action request message with textual comment (e.g. "I really like this scene—Jane") is sent to central server 107.

In order for message server 109 to distribute action request 227 to terminal 101 (host user) and action request 229 to terminal 103 (guest user A), guest user B (terminal 105) may require permission in a variation of the embodiment, allowing guest user B to request the given action. As an example, guest user B may be permitted to comment during the playback session but not rewind the video presentation. In the exemplary embodiment, permissions for active users are stored on central 107 (logically corresponding to user data server 111). In variations of the embodiment, the host user may be conversing with the guest users through a conferenced voice telephone call. In another variation of the invention, the permissions are stored in terminal 101, 103, or 105 and not in central server 107. Once the permission is checked with server 107, the locally stored permissions expedite the process of checking with central server 107 again.

In FIG. 2, the host user stops the playback session by sending stop playback request 231 from terminal 101 to central server 107. Central server 107 distributes stop playback request step requests 233 and 235 to terminals 103 and 105 respectively, causing the media players to stop playing the media file.

The playback session is started in a substantially synchronous manner for all the active users (host user, guest user A, and guest user B). Synchronism can be achieved by a number of approaches. Central server 107 stores an internal time at the time of starting the playback session. The playback session commences when central server 107 receives start playback request 201 and consequently distributes start playback request 203 and 205 to guest user A and guest user B, respectively. At that time, central server 107 stores the internal time for starting the playback session. Other guest users (not depicted in FIG. 2) can later join the playback session. The elapsed time since the beginning of the playback session is sent in the start playback request to the newly joining guest user.

If a greater degree of synchronicity is desired (as may be the case if time delays in system 100 are a concern), a more complex method to ensure true synchronicity can be incorporated by system 100. For example, the internal times tracked by terminals 101, 103, and 105 and central server 107 can be synchronized to a common global clock, e.g. the Global Positioning System (GPS). Central Server 107 compares the internal clocks (as reported in messages such as accept responses 207 and 215) with the internal clock of central server 107. The time delays can be compensated by sending the corresponding time differences to terminals 101, 103, and 105 so that the corresponding playback device (which are considered as logically contained in the terminal) can coordinate media player operation in order to synchronize player actions.

Figure 3:
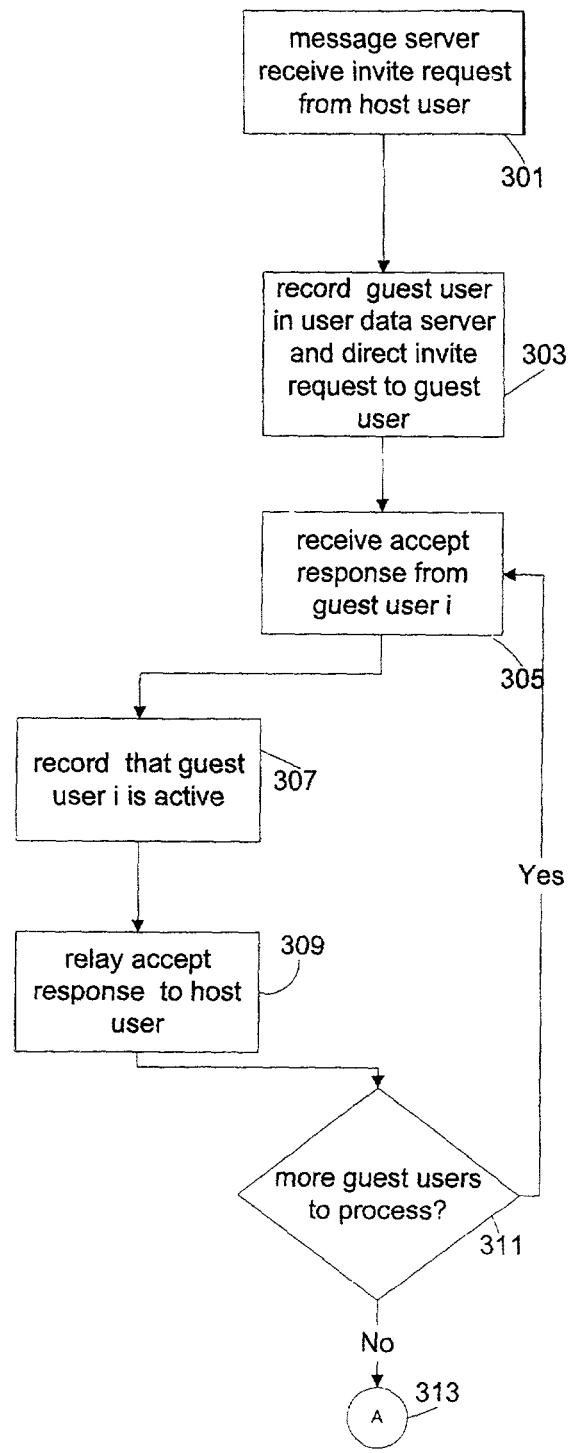
FIG. 3 shows a flow diagram for initiating a playback session according to one embodiment of the present invention.

FIG. 3 shows a flow diagram for initiating a playback session according to one embodiment of the present invention. In step 301, message server 109 receives invite request 201 from terminal 101 (host user). In step 303, message server 109 instructs user data server 111 to record the identification of terminals 103 and 105 and distributes invite requests 203 and 205 to terminals 103 and 105, respectively.

In step 305, message server 109 receives accept response 207 and 215 from terminals 105 and 103, respectively. In step 307, message server 109 instructs user data server 111 to record terminals 105 and 103 as being active in the playback session. Message server 109 relays accept responses 209 and 217 to terminal 101 in step 309.

In the exemplary embodiment, the host user waits until all the guest users have accepted the invitation in step 311. However, with variations of the exemplary embodiment, the host user may wish to continue with the playback session when a subset of the invited guest users has accepted.

Figure 4:
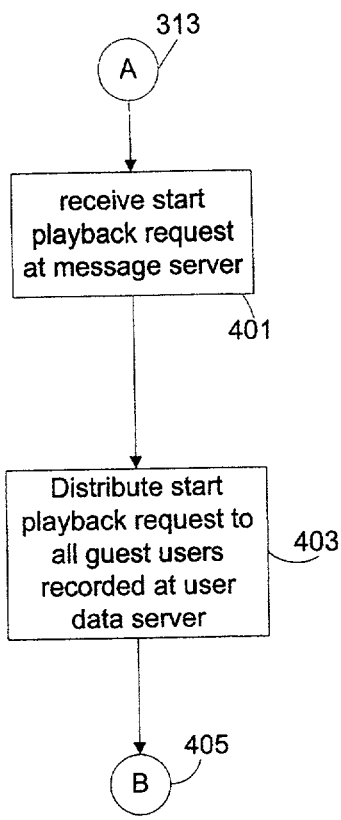
FIG. 4 shows a flow diagram for starting the playback of a media file according to one embodiment of the present invention.

FIG. 4 shows a flow diagram for starting the playback of a media file according to one embodiment of the present invention. The host user starts the playback session by sending start playback request 219 to message server 109 in step 401. Consequently, in step 403 message server 109 distributes start playback request to terminals 103 and 105 (corresponding to the guest users that have accepted the invitation form the host user).

Figure 5:
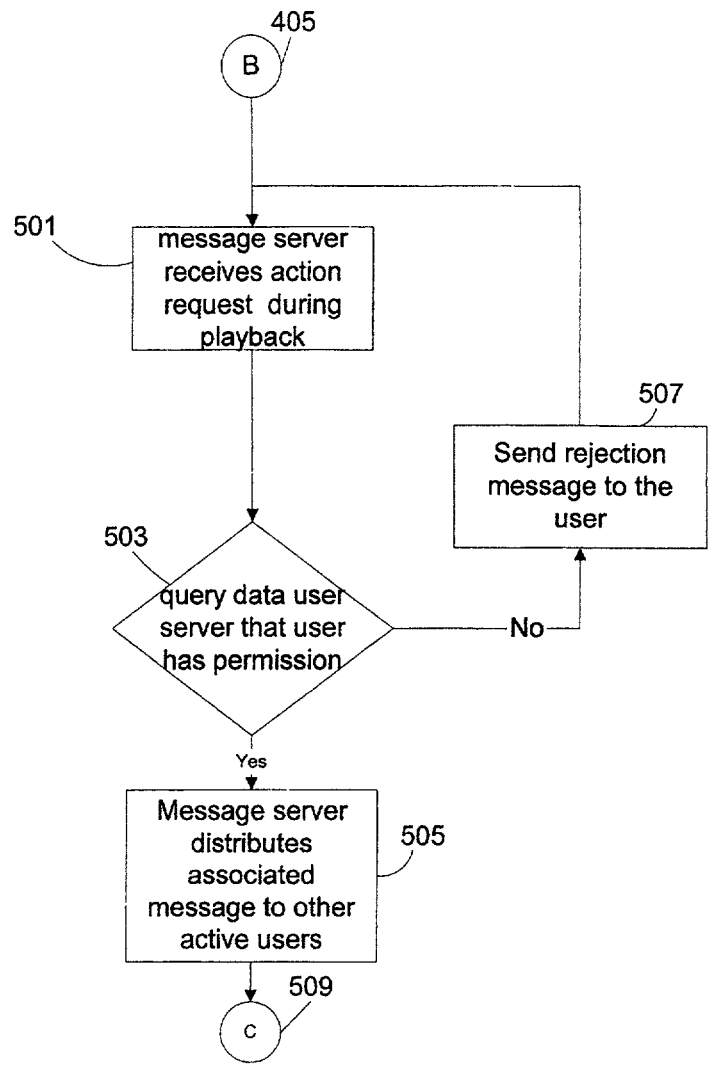
FIG. 5 shows a flow diagram for processing an action request during a playback session according to one embodiment of the present invention.

FIG. 5 shows a flow diagram for processing an action request during the playback session according to one embodiment of the present invention. In step 501, message server 109 receives action request 225 from terminal 105 (guest user B). Message server 109 verifies that guest user B has permission to request the given action by querying user data server 111 in step 503. Assuming that guest user B has the appropriate permission, action requests 227 and 229 are distributed to the other active users (terminals 101 and 103) in step 505 in order that the playback devices can respond accordingly. (If guest user B does not have permission, message server 109 informs terminal 105 about a rejection of the request in step 507.)

Figure 6:
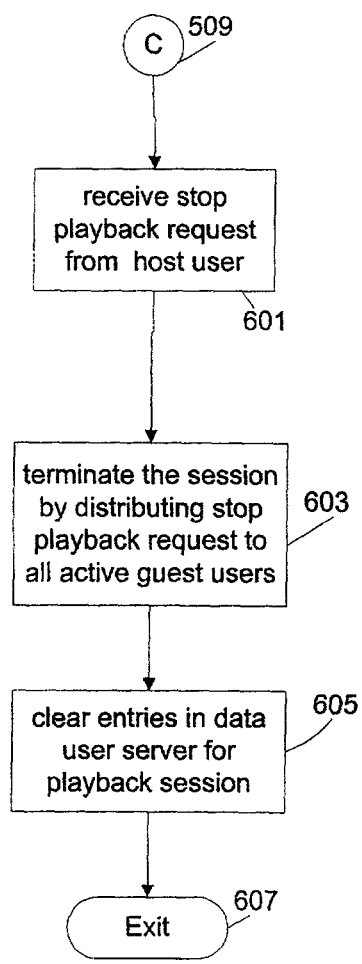
FIG. 6 shows a flow diagram for processing a stop playback request during a playback session according to one embodiment of the present invention.

FIG. 6 shows a flow diagram for processing a stop playback request according to one embodiment of the present invention. In the exemplary example, terminal 101 (host user) desires to end the playback session by sending stop playback request 231 to message server 109. Message server 109 distributes stop playback requests 233 and 235 to terminal 103 and 105, respectively. Alternatively, a guest user can withdraw from the playback session by sending a stop playback request to message server 109. In that case, message server 109 instructs user data server 111 to remove the guest user from the active list associated with the playback session. In another variation of the invention, terminal 101, 103, or 105 automatically sends a stop playback notification to message server 109 when the user stops playback with the terminal.

It is assumed that terminals 101, 103, and 105 can fully utilize the selected media file. However, this may not be the case. With a plurality of terminals participating in the playback session, the terminals may have different capabilities. For example, the playback session may be processing a movie having both audio and video components. One of terminals (e.g. terminal 105) may have only audio capability while terminals 103 and 103 have both audio and video capabilities. Moreover, the active users in the playback session may desire to modify the media file in order to accentuate the viewing experience.

According to one embodiment, the playback device associated with each of terminals 101, 103, and 105 is able to modify media characteristics, using a preset selection of effects and modifications (e.g. converting color imagery into black and white, inverting the colors, distorting the sound channels, changing the tempo and speed of the playback) stored at the terminal. In other words, a playback device utilizes a data file containing associated modifications in order to alter the processing of the media file during the playback session.

Figure 7:
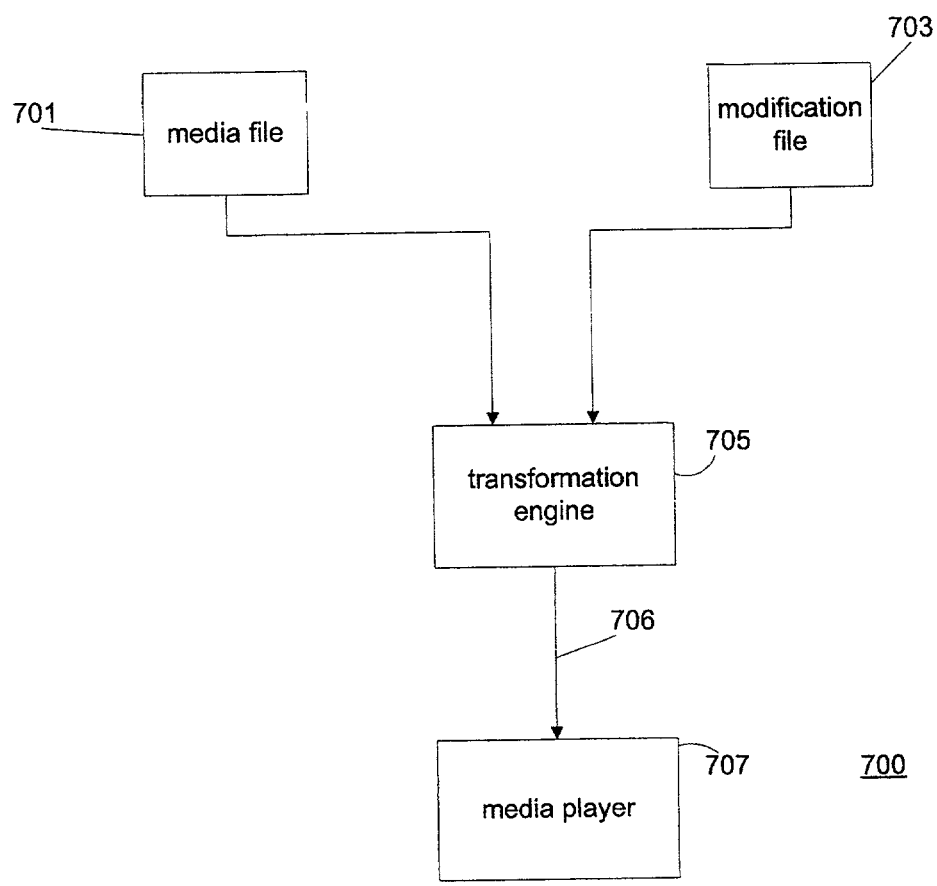
FIG. 7 depicts the processing of a media file of a playback device.

FIG. 7 depicts the processing of media file 701 by playback device 700. Media player 707 uses modification file 703 to modify the processing of media file 701. The modification file overrides the original display parameters of the media file at display time, thus the receiver can view the media file according to the intentions of the sender. In the exemplary embodiment, transformation engine 705 utilizes media file 701 and modification file 703 to derive a modified media file 706 that is processed by media player 707. In the exemplary embodiment, playback device 700 is logically contained in terminal 101, 103, or 105. Playback device 700 may be physically contained in the terminal or physically distinct from the terminal. The modification file can be formed by storing all the playback control messages created during the playback session.

Modification file 703 can be formed by storing all the playback control messages created during the playback session. In one variation, the users access modification files associated with a particular media file and play back the media file using the modification file. Modification files can be stored in the remote (central) server or local memory of user's terminal.

Modification file 703 comprises a unique media file identifier and a list of modification functions that are linked to media file 701 with the following characteristics:
  Modification effect ID
  Modification start time
  Modification end time
  Modification author ID
  Other user provided string for user created options (e.g. text)

In addition, modification file 703 can comprise DRM-related data, which limits use of media file 703 by a guest user.

Figure 8:
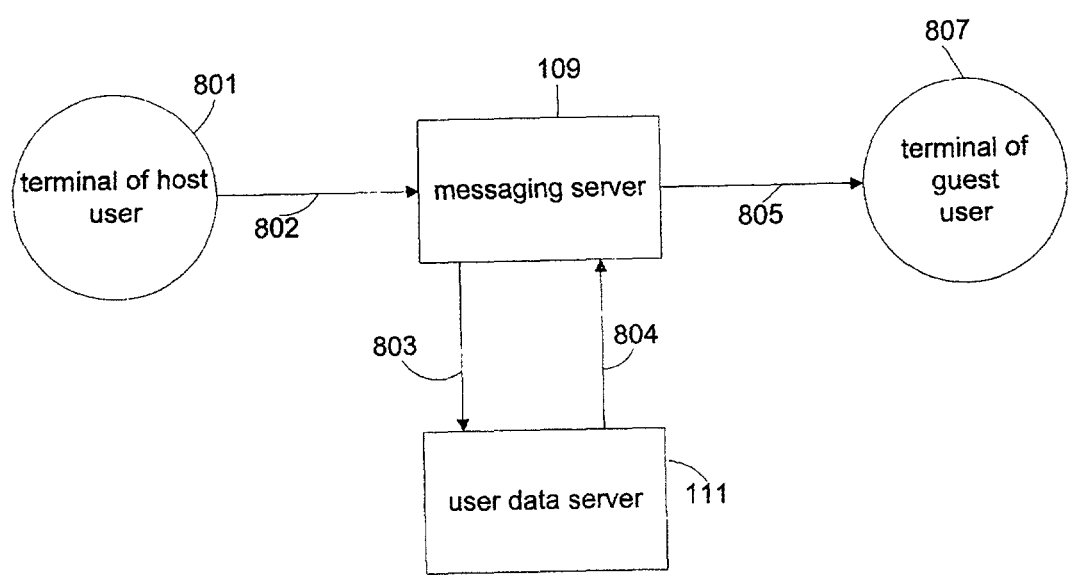
FIG. 8 shows apparatus for altering a modification file by a synchronous media playback and messaging system in accordance with the capabilities of a terminal.

Using a suitable messaging standard (e.g. Multimedia Message System), modification file 703 can be more usable in the receiving terminal that is unable to display media file 701 or display modified media file 706 by appropriately altering modification file 703. FIG. 8 shows apparatus for altering modification file 703 by system 100 in accordance with the capabilities of terminal 807. Messaging server 109 receives modification message 802 (comprising modification file 703) from terminal 801 (e.g. terminal 101 in FIG. 1) for terminal 807 (e.g. terminal 103 in FIG. 1). Modification message 802 is typically sent between invite request 201 and start playback request 219 before the establishment of the playback session.

Messaging server 109 queries user data server 111 in order to determine if modification file 703 requires adaptation in accordance with the capabilities of terminal 807 by sending message 807 (comprising modification message 802 and the identification of terminal 807). User data server 111 stores characteristics of terminal 807 and correspondingly alters the modification file and returns adapted modification message 804 to messaging server 109.

Messaging server 109 converts a selected media file in order to be compatible with the capabilities of terminal 807. The converted terminal-suitable media file is delivered to terminal 807. The basic media type remains similar, e.g. full motion video, but the modification capabilities are dissimilar. Thus, one terminal may be capable of showing a video effect on the image, e.g. inverting the colors, while another terminal may not be capable of that particular effect. The modification file describing the "invert" effect is altered to another suitable effect for this particular terminal, e.g. blink the image on/off in a stroboscope fashion.

In a variation of the embodiment, messaging server 109 directs modification message 805 (comprising the altered modification file) to terminal 807. As an example, a terminal without video playback capabilities can process a media file by creating still image compilation of key images. As another example, the audio portion of the playback session may be converted to text captions for users who are hearing-impaired.

Figure 9:
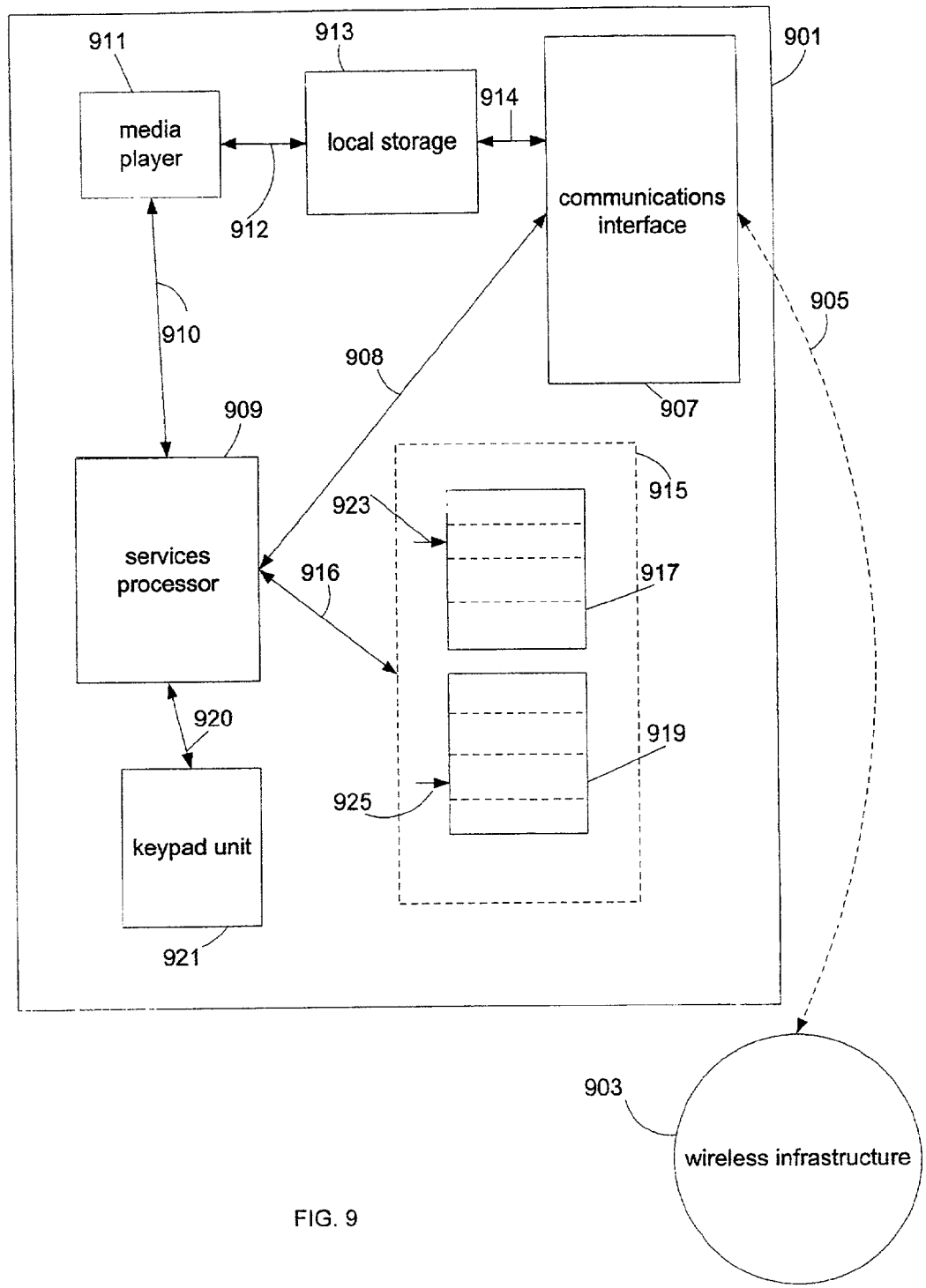
FIG. 9 shows apparatus for supporting a wireless terminal for a host user according to one embodiment of the present invention.

FIG. 9 shows apparatus for supporting a wireless terminal 901 for a host user. Wireless terminal 901 provides communication for the host user to at least one guest user over wireless communications channel 905 through wireless infrastructure 903. Wireless infrastructure 903 comprises switching and radio equipment as known in the art. Wireless terminal 901 interfaces to wireless communications channel 905 through communications interface 907. Communications interface 907 comprises radio and logic circuitry that is required for transmitting and receiving signals over wireless communications channel 905.

Services processor 909 supports the processing of the media playback services for the host user in accordance with the flow diagrams in FIGS. 3, 4, 5, and 6. Services processor 909 generates messages as shown in FIG. 2 and instructs communications interface 907 to transmit the messages over wireless communications channel 905 through link 908. Also, messages received from a terminal of a guest user are received at communications interface 907 and is transferred to services processor 90 for processing in according to the flow diagrams shown in FIGS. 3, 4, 5, and 6.

Media file 701 (as shown in FIG. 7) is stored in local storage 913 and is played during the playback session by media player 911 through link 912 as instructed by services processor 909 through link 910. If local storage 913 does not contain media file 701, services processor 909 can request for the desired media file from media server 113 (as shown in FIG. 1) through communications interface 907, wireless communications channel 705, and wireless infrastructure 903.

The host user inputs requests through keypad unit 921 that is connected to services processor 909 through link 920. The host user views display unit 915 that displays choices from which the host user inputs selects using a cursor control on keypad unit 921, In the exemplary embodiment, display unit 915 shows list 917 of media files and list 919 of guest users that are to be selected for the playback session. The host user inputs associated selections through the cursor control on keypad unit 921 through link 920, services processor 909, and link 916. The host user selects the media file with cursor 923 and selects at least one guest user with cursor 925. Lists 917 and 919 may be shown currently or sequentially on display unit 915.

Although FIG. 9 depicts terminal 901 as utilizing wireless communications channel 905, variations of the exemplary embodiment can utilize other types of communications channels (e.g. wireline communications channel and cable modem communications channel). Examples of applicable standards and specifications include Global System of Mobile Communications (GSM), Telecommunications Industry Association (TIA) IS-95 and cdma2000 (CDMA), TIA IS-136 and IS-54 (TDMA), EIA/TIA-553 (analog), Digital Audio Broadcasting (DAB), Digital Video Broadcasting (DVB), and Universal Mobile Telecommunications System (UMTS).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor and associated peripheral electronic circuitry.

It is to be understood that the above-described embodiment is merely an illustrative principle of the invention and that many variations may be devised by those skilled in the art without departing from the scope of the invention. It is, therefore, intended that such variations be included with the scope of the claims.

We claim:

1. A method comprising:
   receiving a first media playback invite request initiated by a host wireless terminal, the first media playback invite request including
      information sufficient to identify at least one guest wireless terminal,
      an identification of a pre-existing playable media file, and
      a playback option enabling the guest wireless terminal to request different types of playback actions in connection with playback of the identified media file;
   transmitting a second media playback invite request to the guest wireless terminal subsequent to receipt of the first media playback invite request, wherein the second media playback invite request includes the playback option;
   relaying a media playback accept response from the guest wireless terminal to the host wireless terminal;
   distributing a start playback request from the host wireless terminal to the guest wireless terminal, wherein the start playback request directs the guest wireless terminal to begin a playback session of the identified media file in synchronization with a beginning of the playback session at the host wireless terminal;
   receiving an action request from the guest wireless terminal requesting a playback action enabled by the playback option; and
   sending the action request received from the guest wireless terminal to the host wireless terminal.

2. The method of claim 1, further comprising:
   distributing the action request to another wireless terminal during the playback session.

3. The method of claim 1, further comprising:
   verifying permissions associated with the guest wireless terminal,
   wherein the sending of the action request received from the guest wireless terminal to the host wireless terminal is responsive to verifying the permissions associated with the guest wireless terminal.

4. The method of claim 1, wherein the requested playback action is selected from the group consisting of a rewind request, a pause playback request, a fast forward request, a textual comment request, and a user-specified internal effect algorithm to modify audio or video of the identified media file.

5. The method of claim 1, further comprising:
   distributing a stop playback request from the host wireless terminal to the guest wireless terminal in response to a host wireless terminal user terminating the playback session.

6. The method of claim 1, further comprising:
   storing an internal time in response to distributing the start playback request; and
   providing an elapsed time to a second guest wireless terminal when the second guest wireless terminal joins the playback session during the playback session.

7. The method of claim 1, further comprising:
   receiving a first internal time from the host wireless terminal or the guest wireless terminal, wherein the first internal time is derived from a global time;
   comparing the first internal time to a second internal time in order to derive a time difference, wherein the second internal time is derived from the global time; and
   adjusting transmission of a subsequent message to the host wireless terminal or the guest wireless terminal based on the result of the comparing.

8. The method of claim 1, further comprising:
   receiving a stop playback request from the guest wireless terminal in response to a guest wireless terminal user withdrawing from the playback session; and
   removing a session entry that is associated with the guest wireless terminal, wherein the session entry indicates participation of the guest wireless terminal in the playback session.

9. The method of claim 1, further comprising:
   receiving a stop playback request from the host wireless terminal in response to a host wireless terminal user ending the playback session; and
   terminating the playback session in response to receiving the stop playback request.

10. The method of claim 1, further comprising:
    instructing the guest wireless terminal to modify the identified media file in accordance with a modification file during the playback session.

11. The method of claim 1, wherein the identified media file is locally stored on the guest wireless terminal for playback.

12. The method of claim 1, wherein if the guest wireless terminal does not have the identified media file, the guest wireless terminal downloads the identified media file before sending the media playback accept response.

13. A non-transitory computer-readable medium, comprising instructions that, when executed, cause a computer to perform: receiving a first media playback invite request initiated by a host wireless terminal, the first media playback invite request including information sufficient to identify at least one guest wireless terminal, an identification of a pre-existing playable media file, and a playback option enabling the guest wireless terminal to request different types of playback actions in connection with playback of the identified media file; transmitting a second media playback invite request to the guest wireless terminal subsequent to receipt of the first media playback invite request, wherein the second media playback invite request includes the playback option; relaying a media playback accept response from the guest wireless terminal to the host wireless terminal; distributing a start playback request from the host wireless terminal to the guest wireless terminal, wherein the start playback request directs the guest wireless terminal to begin a playback session of the identified media file in synchronization with a beginning of the playback session at the host wireless terminal; receiving an action request from the guest wireless terminal requesting a playback action enabled by the playback option; and sending the playback option received from the guest wireless terminal to the host wireless terminal.

14. The non-transitory computer-readable medium of claim 13, further comprising instructions that, when executed, cause the computer to perform: distributing the action request to another wireless terminal during the playback session.

15. The non-transitory computer-readable medium of claim 13, further comprising instructions that, when executed, cause the computer to perform: distributing a stop playback request from the host wireless terminal to the guest wireless terminal and at least one other wireless terminal in response to a host wireless terminal user terminating the playback session.

16. The non-transitory computer-readable medium of claim 13, wherein the identified media file is locally stored on the guest wireless terminal for playback.

17. The non-transitory computer-readable medium of claim 13, further comprising instructions that, when executed, cause the computer to perform: verifying permissions associated with the guest wireless terminal, and wherein the sending of the playback option action request received from the guest wireless terminal to the host wireless terminal is responsive to verifying the permissions associated with the guest wireless terminal.

18. A method comprising:
sending a media playback invite request to at least one guest wireless terminal from a host wireless terminal, wherein the media playback invite request includes
information sufficient to identify the at least one guest wireless terminal,
an identification of a pre-existing playable media file, and
a playback option enabling the guest wireless terminal to request different types of playback actions in connection with playback of the identified media file;
receiving a media playback accept response from the guest wireless terminal in response to sending the media playback invite request;
in response to receiving the media playback accept response, sending a start playback request to the guest wireless terminal, wherein the start playback request begins a playback session of the identified media file in synchronization with a beginning of the playback session at the host wireless terminal;
receiving an action request from the guest wireless terminal requesting a playback action enabled by the playback option; and
modifying the playback session of the identified media file in response to the action request.

19. The method of claim 18, further comprising:
sending an action request to the guest wireless terminal, in response to the host wireless terminal user initiating the action request.

20. The method of claim 18, further comprising:
receiving the action request from the guest wireless terminal, in response to the guest wireless terminal user initiating the action request.

21. The method of claim 19 or claim 20, wherein the requested playback action is selected from the group consisting of a rewind request, a pause playback request, a fast forward request, a textual comment, and a request for a user-specified internal effect algorithm to modify audio or video of the identified media file.

22. The method of claim 18, further comprising:
sending a stop playback request to the guest wireless terminal in response to the host wireless terminal user terminating the playback session.

23. The method according to any of the claim 18, 19, 20 or 22, wherein the requests are processed through a server.

24. The method of claim 18, wherein the identified media file is locally stored on the guest wireless terminal for playback.

25. A non-transitory computer-readable medium, comprising instructions that, when executed, cause a device to perform: sending a media playback invite request to at least one guest wireless terminal from a host wireless terminal, wherein the media playback invite request includes information sufficient to identify the at least one guest wireless terminal, an identification of a pre-existing playable media file, and a playback option enabling the guest wireless terminal to request different types of playback actions in connection with playback of the identified media file; receiving a media playback accept response from the guest wireless terminal in response to sending the media playback invite request; sending a start playback request to the guest wireless terminal in response to receiving the media playback accept response, wherein the start playback request begins a playback session of the identified media file in synchronization with a beginning of the playback session at the host wireless terminal; receiving an action request from the guest wireless terminal requesting a playback action enabled by the playback option; and modifying the playback session of the identified media file in response to the action request.

26. The non-transitory computer-readable medium of claim 25, further comprising instructions that, when executed, cause the device to perform: sending an action request to the guest wireless terminal, in response to the host wireless terminal user initiating the request.

27. The non-transitory computer-readable medium of claim 25, wherein the action request is received responsive to the guest wireless terminal user initiating the action request.

28. The non-transitory computer-readable medium of claim 25, wherein the identified media file is locally stored on the guest wireless terminal for playback.

29. An apparatus comprising:
a processor; and
memory storing executable instructions that, when executed, cause the apparatus to
receive a media playback invitation at the apparatus from a server via a wireless channel, wherein the media playback invitation includes
an identification of a pre-existing playable media file, and
a playback option enabling the apparatus to request different types of playback actions in connection with playback of the identified media file,
responsive to receiving the media playback invitation, transmit a media playback accept response to the server, wherein if the apparatus does not have the identified media file, the apparatus downloads the identified media file before transmitting the media playback accept response,
receive at the apparatus a start playback request, wherein the start playback request begins a playback session of the identified media file in synchronization with a beginning of the playback session at a host wireless terminal, and
subsequent to receiving the start playback request, transmit an action request to the server, wherein the action request requests a playback action enabled by the playback option.

30. The apparatus of claim 29, wherein the processor includes executable instructions to perform:
modifying the identified media file in accordance with a modification file during the playback session.

31. An apparatus comprising:
a processor; and
a memory storing executable instructions that, when executed, cause the apparatus to
send a media playback invite request to at least one guest wireless terminal from the apparatus, wherein the media playback invite request includes
information sufficient to identify the at least one guest wireless terminal,
an identification of a pre-existing playable media file, and a playback option enabling the guest wireless terminal to request different types of playback actions in connection with playback of the identified media file, receive a media playback accept response from the guest wireless terminal in response to sending the media playback invite request, in response to receiving the media playback accept response, send a start playback request to the guest wireless terminal, wherein the start playback request begins a playback session of the identified media file in synchronization with a beginning of the playback session at the apparatus, receive an action request from the guest wireless terminal requesting a playback action enabled by the playback option, and modify the playback session of the identified media file in response to the action request.

32. The apparatus of claim 31, wherein the media playback invite request includes information sufficient to identify multiple guest wireless terminals.

33. The apparatus of claim 31, wherein the requested playback action is selected from the group consisting of a rewind request, a pause playback request, a fast forward request, a textual comment, and a request for a user-specified internal effect algorithm to modify audio or video of the identified media file.

34. An apparatus comprising:
a processor; and
a memory storing executable instructions that, when executed, cause the apparatus to
receive a first media playback invite request initiated by a host wireless terminal, the first media playback invite request including
information sufficient to identify at least one guest wireless terminal,
an identification of a pre-existing playable media file, and
a playback option enabling the guest wireless terminal to request different types of playback actions in connection with playback of the identified media file,
transmit a second media playback invite request to the guest wireless terminal subsequent to receipt of the first media playback invite request, wherein the second media playback invite request includes the playback option,
relay a media playback accept response from the guest wireless terminal to the host wireless terminal,
distribute a start playback request from the host wireless terminal to the guest wireless terminal, wherein the start playback request directs the guest wireless terminal to begin a playback session of the identified media file in synchronization with a beginning of the playback session at the host wireless terminal,
receive an action request from the guest wireless terminal requesting a playback action enabled by the playback option, and
send the action request received from the guest wireless terminal to the host wireless terminal.

35. A method comprising:
receiving a media playback invitation at a guest wireless terminal from a server via a wireless channel, wherein the media playback invitation includes
an identification of a pre-existing playable media file, and
a playback option enabling the guest wireless terminal to request different types of playback actions in connection with playback of the identified media file;
responsive to receiving the media playback invitation, transmitting a media playback accept response to the server, wherein if the guest wireless terminal does not have the identified media file, the guest wireless terminal downloads the identified media file before transmitting the media playback accept response;
receiving at the guest wireless terminal a start playback request, wherein the start playback request begins a playback session of the identified media file in synchronization with a beginning of the playback session at a host wireless terminal; and
subsequent to receiving the start playback request, transmitting an action request to the server, wherein the action request requests a playback action enabled by the playback option.

36. A non-transitory computer-readable medium, comprising instructions that, when executed, cause a device to perform: receiving a media playback invitation at a guest wireless terminal from a server via a wireless channel, wherein the media playback invitation includes an identification of a pre-existing playable media file, and a playback option enabling the guest wireless terminal to request different types of playback actions in connection with playback of the identified media file; responsive to receiving the media playback invitation, transmitting a media playback accept response to the server, wherein if the guest wireless terminal does not have the identified media file, the guest wireless terminal downloads the identified media file before transmitting the media playback accept response; receiving at the guest wireless terminal a start playback request, wherein the start playback request begins a playback session of the identified media file in synchronization with a beginning of the playback session at a host wireless terminal; and subsequent to receiving the start playback request, transmitting an action request to the server, wherein the action request requests a playback action enabled by the playback option.

* * * * *

UNITED STATES PATENT AND TRADEMARK OFFICE
CERTIFICATE OF CORRECTION

| | | |
|---|---|---|
| PATENT NO. | : 8,417,827 B2 | Page 1 of 1 |
| APPLICATION NO. | : 10/017654 | |
| DATED | : April 9, 2013 | |
| INVENTOR(S) | : Anttila et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2052 days.

Signed and Sealed this
Second Day of December, 2014

Michelle K. Lee
*Deputy Director of the United States Patent and Trademark Office*